United States Patent
Kim et al.

(10) Patent No.: US 11,597,831 B2
(45) Date of Patent: Mar. 7, 2023

(54) POLYACETAL RESIN COMPOSITION AND VEHICLE FUEL PUMP MODULE MADE OF THE SAME WITH EXCELLENT ACID RESISTANCE

(71) Applicants: Hyundai Motor Company, Seoul (KR); Kia Motors Corporation, Seoul (KR); Korea Engineering Plastics Co., Ltd., Seoul (KR)

(72) Inventors: Hyun Jun Kim, Gyeonggi-do (KR); Jong Hyun Kim, Gyeonggi-do (KR); Chang Han Kim, Gyeonggi-do (KR); Man Seok Oh, Gyeonggi-do (KR); Bong Ju Park, Gyeonggi-do (KR); Seung Hwan Joo, Seoul (KR); Hyun Woo Kwak, Gyeonggi-do (KR)

(73) Assignees: Hyundai Motor Company, Seoul (KR); Kia Motors Corporation, Seoul (KR); Korea Engineering Plastics Co., Ltd., Seoul (KR)

( * ) Notice: Subject to any disclaimer, the term of this patent is extended or adjusted under 35 U.S.C. 154(b) by 169 days.

(21) Appl. No.: 17/034,089

(22) Filed: Sep. 28, 2020

(65) Prior Publication Data

US 2021/0115245 A1    Apr. 22, 2021

(30) Foreign Application Priority Data

Oct. 22, 2019    (KR) .................. 10-2019-0131111

(51) Int. Cl.

| | |
|---|---|
| *C08L 59/00* | (2006.01) |
| *C08L 23/06* | (2006.01) |
| *C08K 3/38* | (2006.01) |
| *F02M 59/44* | (2006.01) |
| *C08K 5/098* | (2006.01) |

(52) U.S. Cl.
CPC ............. *C08L 59/00* (2013.01); *C08K 3/38* (2013.01); *C08K 5/098* (2013.01); *C08L 23/06* (2013.01); *F02M 59/445* (2013.01); *C08K 2003/385* (2013.01)

(58) Field of Classification Search
CPC ...... C08L 59/00; C08L 23/06; C08L 2666/02; C08L 2666/48; C08L 2666/52; C08L 2666/54; C08L 2666/78; C08K 3/38; C08K 5/098; C08K 3/22; C08K 13/02; C08K 2003/385
See application file for complete search history.

(56) References Cited

U.S. PATENT DOCUMENTS

| | | | | |
|---|---|---|---|---|
| 5,280,066 | A * | 1/1994 | Tekkanat | C08L 67/02 525/166 |
| 6,384,179 | B2 * | 5/2002 | Tanimura | C08L 59/00 525/154 |
| 11,299,618 | B2 * | 4/2022 | Okui | C08K 3/22 |
| 2001/0007006 | A1 * | 7/2001 | Tanimura | C08L 59/00 525/472 |
| 2002/0051856 | A1 * | 5/2002 | Delbarre | C09J 123/06 428/36.6 |
| 2011/0086952 | A1 * | 4/2011 | Bessho | C08K 5/098 524/100 |
| 2017/0283583 | A1 * | 10/2017 | Tsuzuki | C08K 5/101 |
| 2018/0265695 | A1 * | 9/2018 | Takahashi | C08K 3/40 |
| 2021/0269634 | A1 * | 9/2021 | Ishii | C08L 59/00 |
| 2022/0251367 | A1 * | 8/2022 | Kawahara | C08L 59/02 |
| 2022/0372267 | A1 * | 11/2022 | Shingte | C08L 27/16 |

FOREIGN PATENT DOCUMENTS

| | | | |
|---|---|---|---|
| KR | 10-2003-0028117 A | 4/2003 | |
| WO | WO 2020/013185 A1 * | 1/2020 | ............. C08L 59/00 |

* cited by examiner

*Primary Examiner* — Jane L Stanley
(74) *Attorney, Agent, or Firm* — Fox Rothschild LLP

(57) ABSTRACT

Disclosed herein are a novel polyacetal resin composition and a vehicle fuel pump module made of the same with excellent acid resistance.

17 Claims, 1 Drawing Sheet

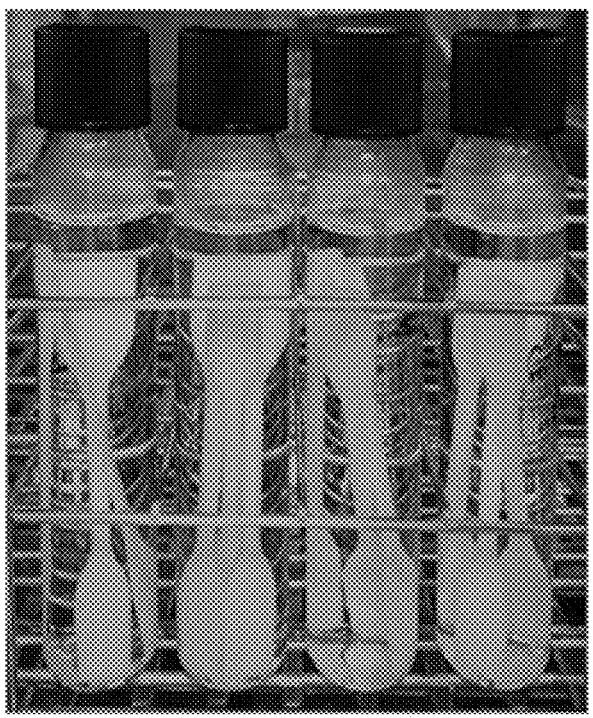

POLYACETAL RESIN COMPOSITION AND VEHICLE FUEL PUMP MODULE MADE OF THE SAME WITH EXCELLENT ACID RESISTANCE

CROSS-REFERENCE TO RELATED APPLICATION

This application claims under 35 U.S.C. § 119(a) the benefit of priority to Korean Patent Application No. 10-2019-0131111 filed on Oct. 22, 2019, the entire contents of which are incorporated herein by reference.

TECHNICAL FIELD

The present invention relates to a novel polyacetal resin composition and a vehicle fuel pump module made of the same with excellent acid resistance.

BACKGROUND

Polyacetal is a crystalline resin, which has been widely used for various electric and electronic products and vehicle components since it is excellent in mechanical properties, creep resistance, fatigue resistance, friction/abrasion resistance, and chemical resistance.

In general, a vehicle device such as a gasoline engine or a diesel engine driven by liquid fuel supplied thereto is provided with a fuel tank for storing the fuel, and the fuel tank is provided therein with a fuel pump module that can forcibly supply the engine with the fuel stored in the fuel tank.

For example, the fuel pump module has been made of a polyacetal resin with excellent chemical resistance because it is in direct or indirect contact with the fuel.

In recent years, an issue has been reported that a vehicle fuel pump module cracks in a zone where sulfur is present in the soil and thus by the sulfur contained in the fuel itself. Hence, vehicle industries require that novel polyacetal resins are developed to manufacture a fuel pump module having excellent acid resistance (fuel resistance).

The above information disclosed in this Background section is only for enhancement of understanding of the background of the invention and therefore it may contain information that does not form the prior art that is already known in this country to a person of ordinary skill in the art.

SUMMARY

In preferred aspects, provided is a polyacetal resin composition that is excellent in physical properties, such as tensile strength, tensile elongation, and impact strength, or in acid resistance, and a vehicle device.

The present invention is not limited to the above-mentioned aspect. Other aspects and advantages of the present invention can become apparent from the following description of the present invention and be realized by the means as claimed and combinations thereof.

In an aspect, provided is a polyacetal resin composition that includes a polyacetal resin, a polyethylene resin having a weight average molecular weight of about $1 \times 10^6$ g/mol or greater, and a metal oxide including one or more selected from the group consisting of calcium stearate ($C_{36}H_{70}CaO_4$), magnesium stearate ($C_{36}H_{70}MgO_4$), and zinc stearate ($C_{36}H_{70}ZnO_4$).

The polyacetal resin may further include an additive distinct from the polyaectal resin, polyethylene resin and metal oxide.

The polyacetal resin may include a homopolymer, a copolymer, or combinations thereof.

The "polyacetal resin" as used herein refers to a polymeric material including repeating units (monomers) of —$(CH_2O)_n$—.

The "homopolymer" of the polyacetal resin refers to a polymer including only repeating units of —$(CH_2O)_n$—. Exemplary homopolymer of the polyacetal resin may be formed from cyclic oligomers of formaldehyde or anhydrous formaldehyde.

The "copolymer" of the polyacetal resin refers to a polymer including a portion of —$CH_2CH_2O$— replacing —$CH_2O$—. For example, the copolymer may be formed by a reaction including one or more monomers (comonomer), whether or not using a catalyst for the reaction. The "polyethylene resin" as used herein refers to a polymeric material including repeating units (monomers) of —$(CH_2-CH_2)_n$—. Preferably, the polyethylene resin may be an ultrahigh-molecular-weight polyethylene (UHMWPE, or UHMW) having extremely long chains having a weight average molecular weight of about $1 \times 10^6$ g/mol or greater, of about $1 \times 10^6$ to $10 \times 10^6$ g/mol, or of about $1 \times 10^6$ to $5 \times 10^6$ g/mol.

Exemplary copolymer may be formed from a reaction including a comonomer, formaldehyde, and/or combinations thereof.

The copolymer may include the comonomer. Exemplary comonomer may include heterocyclic acetal (e.g., dioxolan or alkylene oxide (e.g. ethylene oxide), which may be converted into —$CH_2CH_2O$—.

The copolymer may suitably include the comonomer in an amount of about 3 to 5% by weight base on the total weight of the copolymer.

The polyacetal resin may have a melt index of about 4 g/10 min to 8 g/10 min at a temperature of 190° C. and at a mass of 2,160 g.

The polyacetal resin composition may suitably include the polyethylene in an amount of about 0.5 to 3 parts by weight based on 100 parts by weight of the polyacetal resin.

The additive may include one or more selected from the group consisting of a nucleating agent, and a radical capture additive.

The nucleating agent may suitably include boron nitride (BN).

The polyacetal resin composition may suitably include the nucleating agent in an amount of about 0.01 to 0.05 parts by weight based on 100 parts by weight of the polyacetal resin.

The polyacetal resin composition may suitably include the radical capture additive in an amount of about 0.1 to 2 parts by weight based on 100 parts by weight of the polyacetal resin.

The polyacetal resin composition may suitably include the additive in an amount of about 0.01 to 2 parts by weight based on 100 parts by weight of the polyacetal resin.

The polyacetal resin composition may suitably include the metal oxide in an amount of about 0.5 to 3 parts by weight based on 100 parts by weight of the polyacetal resin.

In an aspect, provided is a vehicle fuel pump module made of the polyacetal resin composition.

The vehicle fuel pump module may have a weight retention rate of about 40% or greater, which is calculated by the following Equation 1:

$$\text{Weight Retention Rate (\%)} = (w_2/w_1) \times 100\%, \quad [\text{Equation 1}]$$

where $w_1$ is a mass of material to be measured before the material is treated with hydrochloric acid, and $w_2$ is a mass of material to be measured remaining after the material is soaked in a hydrochloric acid solution of 5% concentration for 14 days.

Further provided is a vehicle that includes the vehicle fuel pump module as described herein.

Other aspects of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 1 illustrates an example of evaluation of acid resistance for molded samples of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Throughout the invention, like reference numerals refer to like parts throughout the various figures and embodiments of the present invention. The drawings are not necessarily to scale and in some instances, proportions may have been exaggerated in order to clearly illustrate features of the embodiments. Although the terms first, second, etc. may be used herein to describe various elements, these elements should not be limited by these terms. These terms may be only used to distinguish one element from another element. For example, without deviating from the scope and spirit of the present invention, a first element may be referred to as a second element, and, similarly, a second element may also be referred to as a first element. As used herein, the singular forms "a", "an" and "the" are intended to include the plural forms as well, unless context clearly indicates otherwise.

It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof. In addition, it will be understood that when an element, such as a layer, a membrane, a region, or a plate, is referred to as being "above" or "on" another element, it can be "immediately above" the other element or intervening elements may also be present. In contrast, it will be understood that when an element, such as a layer, a membrane, a region, or a plate, is referred to as being "beneath" or "under" another element, it can be "immediately beneath" the other element or intervening elements may also be present.

Unless otherwise indicated, it should be understood that all numbers, values, and/or expressions quantitatively expressing ingredients, reaction conditions, polymer compositions, and combinations used herein are modified in all instances by the term "about" since these are approximations that reflect various uncertainties in measurement occurring essentially to obtain such values among others.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the specification, when ranges are described for variables, it will be understood that the ranges include all variable values inclusive of endpoints subsumed therein. It will be understood that, for example, the range "5 to 10" includes any subranges, such as 6 to 10, 7 to 10, 6 to 9, or 7 to 9, as well as values of 5, 6, 7, 8, 9, and 10, and also includes any values between integers suitable for the range such as 5.5, 6.5, 7.5, 5.5 to 8.5, and 6.5 to 9. In addition, it will be understood that, for example, the range "10% to 30%" includes any subranges, such as 10% to 15%, 12% to 18%, or 20% to 30%, as well as all integers of 10%, 11%, 12%, and 13%, inclusive of up to 30%, and also includes any values between integers suitable for the range such as 10.5%, 15.5%, and 25.5%.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Provided are a polyacetal resin composition and a vehicle fuel pump module made of the same.

In an aspect, provided is a polyacetal resin composition including a polyacetal resin, a polyethylene, and a metal oxide.

The polyacetal resin may further include an additive distinct from the polyaectal resin, polyethylene resin and metal oxide.

The polyacetal resin may include a homopolymer, a copolymer, and combinations thereof.

The homopolymer may be prepared by polymerizing one or more selected from the group consisting of formaldehyde and cyclic oligomers of formaldehyde.

The copolymer may be formed by reaction of a comonomer with one or more selected from the group consisting of formaldehyde and cyclic oligomers of formaldehyde.

The comonomer may be selected from acetals and cyclic ethers. For example, the comonomer may be prepared by polymerizing formaldehyde or a cyclic oligomer thereof with alkylene oxide or cyclic formal such as 1,3-dioxolane, diethylene glycol formal, 1,4-propanediol formal, 1,4-butanediol formal, 1,3-dioxepan formal, or 1,3,6-trioxocane. Preferably, the comonomer may suitably include one or more monomers selected from the group consisting of ethylene oxide, 1,3-dioxolane, and 1,4-butanediol formal. By adding these monomers to trioxane or formaldehyde as a main monomer and randomly copolymerizing them using Lewis acid as a catalyst, an oxymethylene copolymer may be prepared that has a melting point of about 150° C. or greater and two or more bonded carbon atoms in a main chain. When a copolymer is used, the copolymer includes a comonomer in an amount of about 20% by weight or less, about 15% by weight or less, or particularly of about 3 to 5% by weight, based on the total weight of the copolymer.

The polyacetal resin may suitably have a melt index of about 4 g/10 min to 8 g/10 min at a temperature of 190° C. and at a mass of 2,160 g.

The polyethylene resin or an ultrahigh molecular weight polyethylene having a weight average molecular weight greater than about $1 \times 10^6$ g/mol (UHMW-PE) may be included in an amount of about 0.5 to 3 parts by weight based on 100 parts by weight of the polyacetal resin.

The polyethylene resin may be an ultrahigh molecular weight polyethylene having a weight average molecular weight of about $1 \times 10^6$ to $5 \times 10^6$ g/mol. Preferably, the polyethylene resin may be added to the polyacetal resin composition in a form of particles having an average particle diameter of about 50 to 300 μm.

The additive may suitably include one or more selected from the group consisting of a lubricant, a plasticizer, an antioxidant, a filler, a reinforcing agent, a nucleating agent, and a radical capture additive. By optimally adjusting the amount of the nucleating agent and the radical capture additive, the polyacetal resin composition may preferably include both a nucleating agent and a radical capture additive.

The additive may be included in an amount of about 0.01 to 2 parts by weight based on 100 parts by weight of the polyacetal resin.

The nucleating agent may suitably be included in an amount of about 0.01 to 0.05 parts by weight based on 100 parts by weight of the polyacetal resin, and the radical capture additive may suitably be included in an amount of about 0.1 to 2 parts by weight based on 100 parts by weight of the polyacetal resin.

The nucleating agent may suitably include boron nitride (BN).

The nucleating agent may increase the crystallinity of the polyacetal resin composition so that the polyacetal resin composition may have improved mechanical properties and excellent acid resistance. For example, the nucleating agent may suitably include boron nitride having an average particle diameter of about 1 to 15 μm.

The radical capture additive may suitably include a radical scavenger having a hindered amine structure.

The metal oxide may include a divalent metal oxide and include one or more selected from the group consisting of a saturated aliphatic carboxylic acid having a carbon number of 10 to 35, an unsaturated aliphatic carboxylic acid, a salt of an alkaline earth metal element, and a salt of an amphoteric metal element. Preferably, the metal oxide may suitably include one or more selected from the group consisting of calcium stearate ($C_{36}H_{70}CaO_4$), magnesium stearate ($C_{36}H_{70}MgO_4$), and zinc stearate ($C_{36}H_{70}ZnO_4$).

The metal oxide may be included in an amount of about 0.5 to 3 parts by weight based on 100 parts by weight of the polyacetal resin.

Further, provided is a vehicle fuel pump module made of the polyacetal resin composition. The vehicle fuel pump module may have a weight retention rate of about 40% or greater, which is calculated by the following Equation 1:

$$\text{Weight Retention Rate (\%)} = (w_2/w_1) \times 100\%, \quad \text{[Equation 1]}$$

where $w_1$ is a mass of material to be measured before the material is treated with hydrochloric acid, and $w_2$ is a mass of material to be measured remaining after the material is soaked in a hydrochloric acid solution of 5% concentration for 14 days.

Example

Hereinafter, the present invention will be described in more detail with reference to specific examples. However, these examples are only for illustrating the present invention and the scope of the invention is not limited thereto.

Measurement Method

Tensile Strength: the tensile strength of ISO tensile specimens was measured according to the standards of ISO 527-1 and ISO 527-2, and the average value of ISO tensile specimens was calculated by evaluating each sample five times at a crosshead speed of 50 mm/min.

Tensile Elongation: the tensile elongation of ISO tensile specimens was measured according to the standards of ISO 527-1 and ISO 527-2, and the average value of ISO tensile specimens was calculated by evaluating each sample five times at a crosshead speed of 50 mm/min.

Impact Strength: the Charpy impact strength of notched specimens was measured according to the standards of ISO 527-1 and ISO 527-2, and the average value of notched specimens was calculated by evaluating the impact strength of each sample five times at the room temperature of 25° C.

Acid resistance: the weight values of specimens remaining after the specimens are soaked in a 5% hydrochloric acid (HCl) solution at 60° C. for 14 days were calculated as a percentage based on their initial values (FIG. 1)

Material

Polyacetal Resin: a melt index of 6 g/10 min (190° C., load of 2160 g)

Nucleating Agent: boron nitride (BN)

Metal Oxide 1: calcium stearate

Metal Oxide 2: magnesium stearate

Metal Oxide 3: zinc stearate

Experimental Example 1

For Example 1 and Comparative Examples 1 to 6, a polyacetal resin was prepared by adjusting the amount of the comonomer thereof as indicated in the following Table 1, and a molded sample was made of the polyacetal resin and the physical properties thereof were measured such as tensile strength, tensile elongation, impact strength, and acid resistance.

TABLE 1

|  | Comp. Ex. 1 | Comp. Ex. 2 | Comp. Ex. 3 | Comp. Ex. 4 | Comp. Ex. 5 | Ex. 1 | Comp. Ex. 6 |
|---|---|---|---|---|---|---|---|
| Comonomer [w %] | 0 | 0.5 | 1 | 1.5 | 2.5 | 3.5 | 4.5 |
| Tensile Strength [MPa] | 71 | 70 | 69.5 | 68.3 | 67.5 | 66.9 | 66.1 |

TABLE 1-continued

|  | Comp. Ex. 1 | Comp. Ex. 2 | Comp. Ex. 3 | Comp. Ex. 4 | Comp. Ex. 5 | Ex. 1 | Comp. Ex. 6 |
|---|---|---|---|---|---|---|---|
| Tensile Elongation [%] | 35 | 37 | 38 | 40 | 43 | 44 | 45 |
| Impact Strength [KJ/m$^2$] | 12.3 | 11.7 | 11.1 | 10.5 | 9.5 | 8.3 | 7.5 |
| Acid Resistance [%] | 0 | 3 | 6 | 8 | 10 | 15 | 17 |

As shown in the above Table 1, the acid resistances in Example 1 and Comparative Example 6 were significantly greater than those in other Comparative Examples. Particularly, as shown in Example 1, the impact strength was substantially improved while the acid resistance was excellent.

Experimental Example 2

For Examples 2 to 6 and Comparative Examples 7 and 8, a polyacetal resin was prepared by adjusting the amounts of the ultrahigh molecular weight polyethylene and nucleating agent thereof, as indicated in the following Table 2, based on the comonomer content of Example 1 with high acid resistance and impact strength among the physical properties measured in Experimental Example 1. A molded sample was made of the polyacetal resin and the physical properties thereof were measured such as tensile strength, tensile elongation, impact strength, and acid resistance, (in which case the ultrahigh molecular weight polyethylene and the nucleating agent were included in an amount based on 100 parts by weight of the polyacetal resin).

TABLE 2

|  | Comp. Ex. 7 | Ex. 2 | Ex. 3 | Ex. 4 | Ex. 5 | Ex. 6 | Comp. Ex. 8 |
|---|---|---|---|---|---|---|---|
| Comonomer [w %] | 3.5 | 3.5 | 3.5 | 3.5 | 3.5 | 3.5 | 3.5 |
| Ultrahigh Molecular Weight Polyethylene [part by weight] | 1 | 1 | 1 | 1 | 1 | 1 | 1 |
| Nucleating Agent [part by weight] | 0 | 0.01 | 0.02 | 0.03 | 0.04 | 0.05 | 0.06 |
| Tensile Strength [MPa] | 63.5 | 67.2 | 67.9 | 68.5 | 68.9 | 69.4 | 70.2 |
| Tensile Elongation [%] | 39 | 41 | 39 | 38 | 36 | 35 | 34 |
| Impact Strength [KJ/m$^2$] | 6.8 | 6.6 | 6.1 | 5.5 | 4.7 | 4.2 | 3.9 |
| Acid Resistance [%] | 28 | 31 | 38 | 38 | 39 | 40 | 41 |

As shown in the above Table 2, each of Examples and Comparative Examples that the acid resistance was rapidly improved as the amount of the nucleating agent was increased to greater than 0.02 parts by weight. Then, the acid resistance was not significantly affected by the amount of the nucleating agent until the amount of the nucleating agent was 0.05 parts by weight but the impact strength was decreased at a relatively high rate.

Experimental Example 3

For Examples 7 to 10 and Comparative Examples 9 to 11, a polyacetal resin was prepared by adjusting the amount of the metal oxide 1 thereof, as indicated in the following Table 3, based on Example 4 with high acid resistance and impact strength among the physical properties measured in Experimental Example 2. A molded sample was made of the polyacetal resin and the acid resistance thereof was measured, (in which case the metal oxide 1 was included in an amount based on 100 parts by weight of the polyacetal resin).

TABLE 3

|  | Comp. Ex. 9 | Comp. Ex. 10 | Ex. 7 | Ex. 8 | Ex. 9 | Ex. 10 | Comp. Ex. 11 |
|---|---|---|---|---|---|---|---|
| Comonomer [w %] | 3.5 | 3.5 | 3.5 | 3.5 | 3.5 | 3.5 | 3.5 |
| Ultrahigh Molecular Weight Polyethylene [part by weight] | 1 | 1 | 1 | 1 | 1 |  | 1 |

TABLE 3-continued

| | Comp. Ex. 9 | Comp. Ex. 10 | Ex. 7 | Ex. 8 | Ex. 9 | Ex. 10 | Comp. Ex. 11 |
|---|---|---|---|---|---|---|---|
| Nucleating Agent [part by weight] | 0.03 | 0.03 | 0.03 | 0.03 | 0.03 | 0.03 | 0.03 |
| Metal Oxide 1 [part by weight] | 0 | 0.1 | 0.5 | 1 | 2 | 3 | 4 |
| Acid Resistance [%] | 38 | 40 | 44 | 44 | 45 | 45 | 45 |

Referring to the above Table 3, it can be seen in each of Examples and Comparative Examples that the acid resistance is improved as the amount of the metal oxide 1 is increased. Particularly, the acid resistance is rapidly improved when the amount of the metal oxide 1 is 0.5 parts by weight or more. Then, it can be seen that the acid resistance is not significantly changed after the amount of the metal oxide 1 is 2 to 3 parts by weight.

In accordance with the present invention, the polyacetal resin composition can be excellent in physical properties, such as tensile strength, tensile elongation, and impact strength, and in acid resistance.

The present invention is not limited to the above effect. It should be understood that the present invention includes all effects which can be inferred from the above description of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A polyacetal resin composition comprising:
    a polyacetal resin;
    a polyethylene resin having a weight average molecular weight of about 1×10$^6$ g/mol or greater and an average particle diameter of about 50 to 300 μm; and
    a metal oxide comprising one or more selected from the group consisting of calcium stearate ($C_{36}H_{70}CaO_4$), magnesium stearate ($C_{36}H_{70}MgO_4$), and zinc stearate ($C_{36}H_{70}ZnO_4$).

2. The polyacetal resin composition of claim 1, further comprising an additive distinct from the polyacetal resin, polyethylene resin and metal oxide.

3. The polyacetal resin composition of claim 2, wherein the additive comprises one or more selected from the group consisting of a nucleating agent and a radical capture additive.

4. The polyacetal resin composition of claim 3, wherein the nucleating agent comprises boron nitride (BN).

5. The polyacetal resin composition of claim 3, wherein the polyacetal resin composition comprises the nucleating agent in an amount of about 0.01 to 0.05 parts by weight based on 100 parts by weight of the polyacetal resin.

6. The polyacetal resin composition of claim 3, wherein the polyacetal resin composition comprises the radical capture additive in an amount of about 0.1 to 2 parts by weight based on 100 parts by weight of the polyacetal resin.

7. The polyacetal resin composition of claim 2, wherein the polyacetal resin composition comprises the additive in an amount of about 0.01 to 2 parts by weight based on 100 parts by weight of the polyacetal resin.

8. The polyacetal resin composition of claim 1, wherein the polyacetal resin comprises a homopolymer, a copolymer, and/or combinations thereof.

9. The polyacetal resin composition of claim 8, wherein the copolymer is formed by a reaction comprising a comonomer, formaldehyde and/or combinations thereof.

10. The polyacetal resin composition of claim 8, wherein the copolymer comprises a comonomer.

11. The polyacetal resin composition of claim 10, wherein the copolymer comprises an amount of 3 to 5% by weight of the comonomer based on the total weight of the copolymer.

12. The polyacetal resin composition of claim 1, wherein the polyacetal resin has a melt index of about 4 g/10 min to 8 g/10 min at a temperature of 190° C. and at a mass of 2,160 g.

13. The polyacetal resin composition of claim 1, wherein the polyacetal resin composition comprises the polyethylene resin in an amount of about 0.5 to 3 parts by weight based on 100 parts by weight of the polyacetal resin.

14. The polyacetal resin composition of claim 1, wherein the polyacetal resin composition comprises the metal oxide in an amount of about 0.5 to 3 parts by weight based on 100 parts by weight of the polyacetal resin.

15. A vehicle fuel pump module comprising the polyacetal resin composition of claim 1.

16. The vehicle fuel pump module of claim 15, wherein the vehicle fuel pump module has a weight retention rate of about 40% or greater, which is calculated by the following Equation 1:

Weight Retention Rate (%)=($w_2/w_1$)×100%, [Equation 1]

where $w_1$ is a mass of material to be measured before the material is treated with hydrochloric acid, and $w_2$ is a mass of material to be measured remaining after the material is soaked in a hydrochloric acid solution of 5% concentration for 14 days.

17. A vehicle comprising the vehicle fuel pump module of claim 15.

* * * * *